Figure 1:
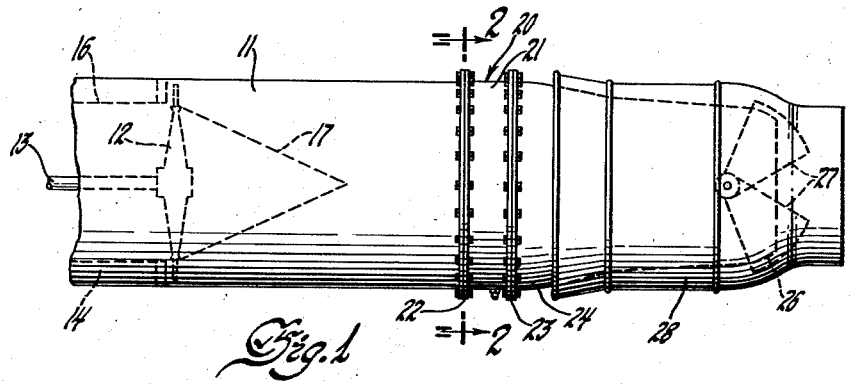

May 28, 1957

H. C. KARCHER 2,793,495

JET PROPULSION COMBUSTION APPARATUS WITH
EXPANSIBLY MOUNTED FUEL MANIFOLD

Filed May 1, 1951

2 Sheets-Sheet 1

Inventor
Harry C. Karcher
By Willits, Helmig & Bailto
Attorneys

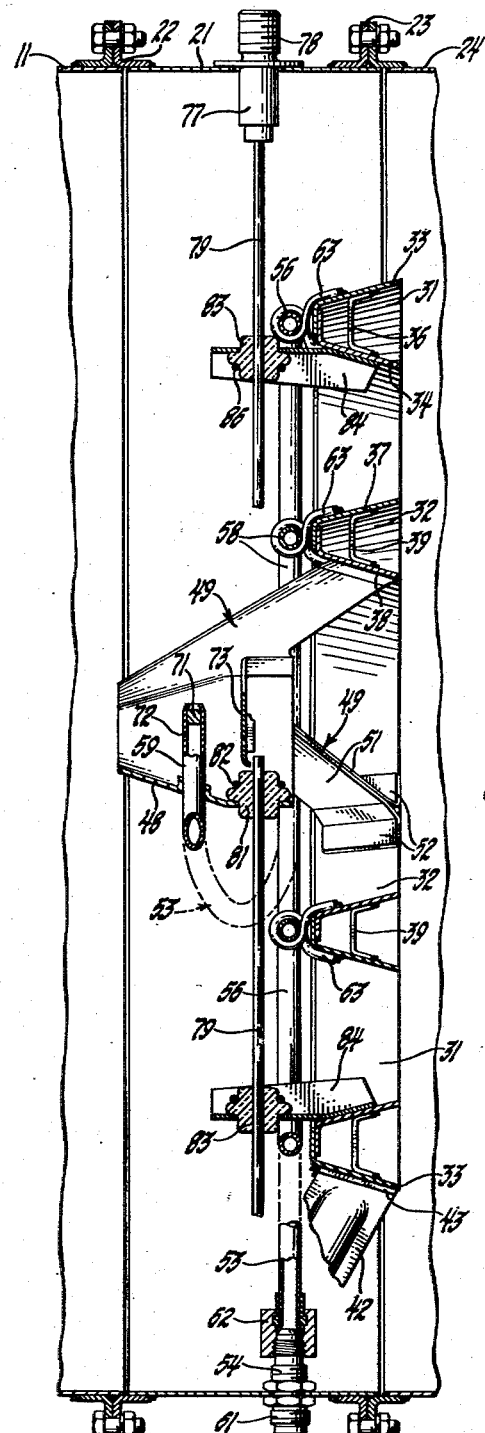
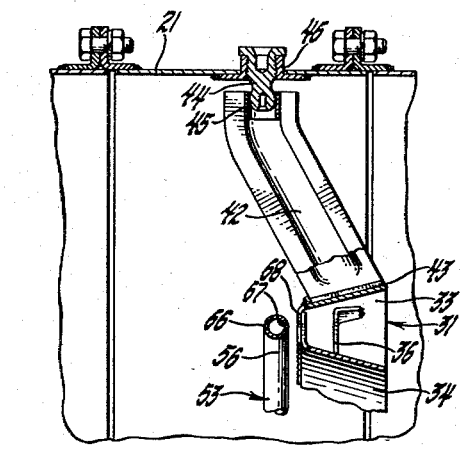
Fig. 4
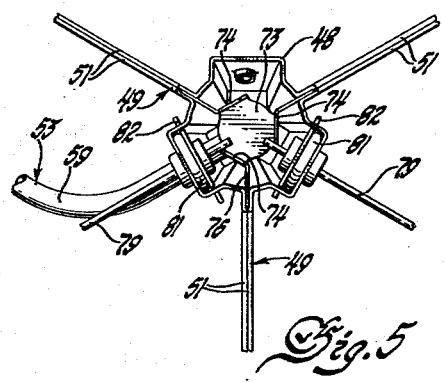
Fig. 5
Fig. 6
Fig. 3
Inventor
Harry C. Karcher
By Willits, Helmig & Baillio
Attorneys

United States Patent Office 2,793,495
Patented May 28, 1957

2,793,495

JET PROPULSION COMBUSTION APPARATUS WITH EXPANSIBLY MOUNTED FUEL MANIFOLD

Harry C. Karcher, Indianapolis, Ind., assignor to General Motors Corporation, Detroit, Mich., a corporation of Delaware Application May 1, 1951, Serial No. 223,994

13 Claims. (Cl. 60—39.72)

This invention relates to combustion apparatus, and is particularly adapted for use in afterburners for gas turbine jet propulsion engines. The invention will be described in terms of its embodiment in an afterburner, although the invention is not limited to this field of application.

The exhaust gases of a gas turbine engine contain large quantities of free oxygen, and the thrust of the engine may be very considerably increased by burning fuel in these exhaust gases so as to increase the temperature and thereby the velocity of the exhaust gases.

The provision of suitable afterburners presents problems of great difficulty. Ignition of fuel and maintenance of efficient combustion in the exhaust duct are difficult because of the relatively high velocity of the gases as compared to conventional combustion apparatus. Moreover, since the gases entering the afterburner may be at temperatures of the order of 1200° F., and the afterburner structure is subjected to heat radiation from the flame in the burner, many failures of afterburner structures have been experienced in practice. Since the afterburner is employed only under emergency conditions, it is important that it impair the normal operation of the engine as little as possible; for example, an afterburner structure which creates any significant pressure loss in the gas stream flowing past it will reduce the thrust of the engine in normal operation. It is also important that the afterburner structure be compact and light in weight for aircraft installations.

This invention is directed to an afterburner which is highly advantageous from the standpoint of good combustion, long life, and light weight, and which offers a minimum of obstruction to gas flow.

The principal objects of the invention are to improve the performance of jet propulsion engines and to provide an improved combustion apparatus adapted for jet propulsion power plants, particularly as an afterburner for turbojet engines. More specific objects are to provide such an apparatus which opposes a minimum resistance to gas flow, which is light in weight, and which is particularly adapted to withstand the high temperatures and vibration encountered.

The manner in which these objects are accomplished and the advantages of the invention will be apparent to those skilled in the art from the succeeding detailed description of the preferred embodiment of the invention.

Figure 2:
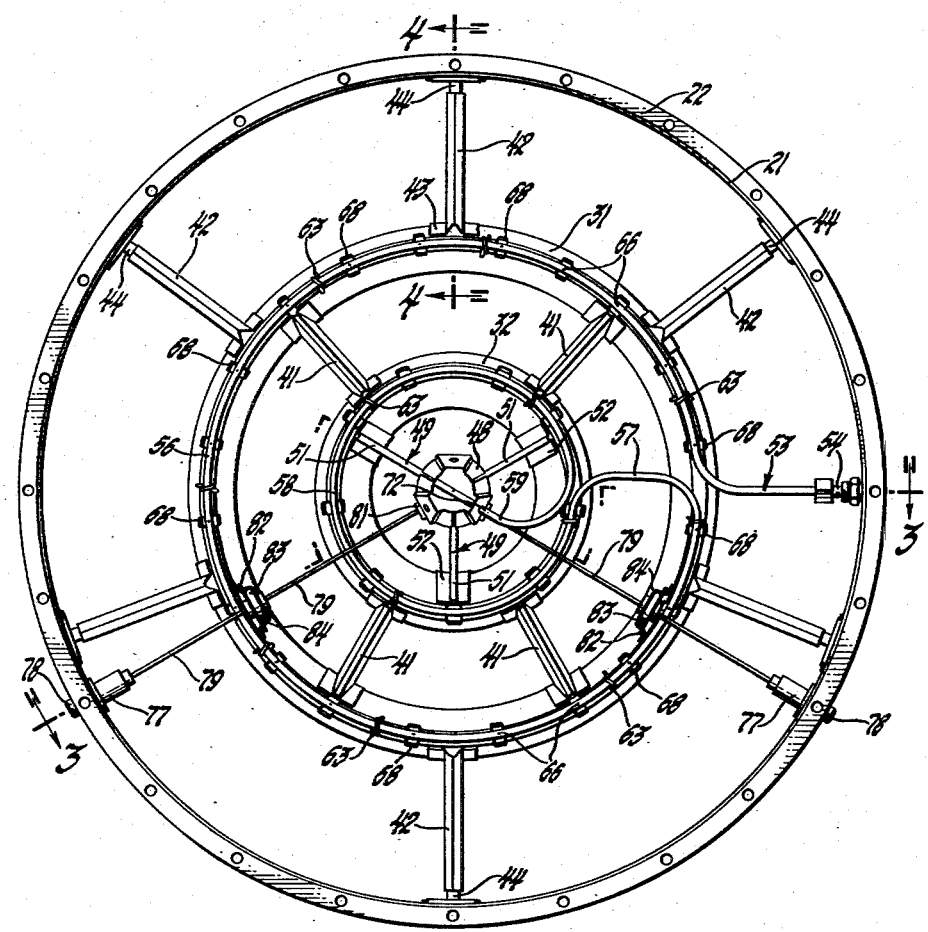

Referring to the drawings, Figure 1 is a schematic view of a portion of a turbojet engine illustrating the installation and environment of the invention; Figure 2 is an axial view of the afterburner taken on the plane 2—2 of Fig. 1 looking downstream with respect to the direction of gas flow; Figures 3 and 4 are sectional views taken on the planes indicated in Figure 2; and Figures 5 and 6 are fragmentary detail views.

Referring first to Figure 1, a turbojet engine is illustrated as comprising a generally cylindrical duct 11 within which is mounted a turbine wheel 12 on a shaft 13. Combustion gases may be supplied to the turbine from any suitable combustion apparatus through an annular duct 14 bounded by the outer wall 11 and an inner conduit 16.

The gases exhaust from the turbine through a passage bounded by the outer wall 11 and an inner conical member 17 commonly called a tailcone. The exhaust passage thus increases in area downstream of the turbine to decelerate the exhaust gases. In a turbojet engine without an afterburner the exhaust duct 11 ordinarily terminates in a fixed converging nozzle from which the propulsive jet issues.

In order to augment the thrust of the engine for emergency condition, an afterburner or reheat burner indicated generally at 20 is provided to introduce and burn fuel in the exhaust gases to increase the temperature of the gases. As illustrated, the afterburner comprises a cylindrical casing 21 provided with a forward bolting flange 22 by which it is fixed to the exhaust duct 11 and a rear bolting flange 23 by which it is bolted to a tube or duct 24 constituting a continuation of the exhaust pipe. The duct 24 provides a combustion chamber in which the fuel introduced in the afterburner 21 is burned, and terminates in a jet exhaust nozzle 26. Hinged valves 27 or other means may be provided in accordance with known practice to vary the effective area of the exhaust to accommodate the engine to normal operation or the afterburning operation. An annular shroud 28 may be provided around the exhaust duct 24 and nozzle 26.

Since this general configuration is known to those skilled in the art and the details of the structures illustrated in Figure 1 other than the afterburner assembly 20 are immaterial to the invention, they will not be further described.

As is understood by those skilled in the art, the afterburner operates on hot turbine exhaust gases, only a small part of the oxygen of which has been combined with fuel, which gases are flowing at a relatively rapid rate such as to require special provisions for the maintenance of a flame in the exhaust. While various structures for maintaining combustion in turbine exhaust have been proposed, I believe that to be described to be particularly advantageous for this purpose. Referring now to Figures 2 to 6, the duct 21 is seen to be cylindrical, which is the preferred form. The flanges 22 and 23 not only serve as means for mounting the afterburner in the exhaust duct but also strengthen the tube or duct 21, which is of large diameter, usually of the order of two or three feet.

In order to establish a controlled turbulence in the gas, which flows from left to right in Figure 3, a flameholder assembly comprising two concentric flameholder rings 31 and 32 is mounted in the afterburner and supported from the wall 21. The outer flameholder 31 is of a more or less V-shaped or U-shaped section closed at the upstream face and open at the downstream face, the width of the flameholder being greatest at the downstream face. Structurally, the flameholder 31 preferably comprises two flanged tapering rings 33 and 34, the flanges of which overlap to form the closed forward face of the flameholder. The rings 33 and 34 are held assembled together by a number of brackets or clips 36 spaced around the flameholder, the turned-over ends of the brackets 36 being welded to the rings 33 and 34. The inner flameholder 32 is of the same type of construction, comprising an outer ring 37, an inner ring 38, and clips 39 welded to the two rings. Radial struts 41, which may be formed of sheet metal, with outwardly extending flanges at the ends of the struts, are welded to the outer ring 37 of the inner flameholder and the inner ring 34 of the outer flameholder, thus supporting the inner flameholder from the outer. The outer flameholder 31 is supported from the duct wall 21 by a number of generally radial struts 42, which may be formed from sheet metal or thin-walled tubing, and which include flanges 43 at the inner ends of the struts which are welded to the outer ring 33. Referring particularly to Figure 4, the struts 42 include a cylindrical socket 45 at the outer end within which is received the spherical end of a mounting plug 44 which screws into a socket 46 welded to the duct wall 21. This arrangement provides for relative radial expansion of the duct 21 and the flameholder assembly while maintaining the location of the flameholder assembly. The flameholder may be put in place with the sockets 45 aligned with the bosses 46 and may be secured in position by introducing the plugs 44.

The flameholder assembly also includes an inner member 48 which may be termed a pilot flame tube, which is of generally conical form, is open at both ends, and diverges downstream. The flame tube 48 serves as an additional flameholder and provides a location for the fuel ignition means to be described. Since it diverges downstream, it acts as a diffuser. The flame tube 48 is preferably mounted somewhat in advance of the rings 31 and 32 and is supported from the inner ring by three strut means 49.

In the preferred structural form of the tube 48 and struts 49, as shown more particularly in Figure 5, the tube 48 is formed of three portions, each extending 120 degrees around the axis of the tube 48 and including two extending wings or plates 51. The wings 51 lie against those of the adjacent sections to form the struts 49 and may be welded together. The outer ends of the strut portions 51 are bent over to form flanges 52 (Figures 2 and 3) by which these are welded to the inner flameholder 32. It will thus be seen that the pilot flame tube 48 and the struts therefor may be formed essentially by bending from sheet metal and are thus easily fabricated. Struts 41, 42, and 49 may all be formed with convex outer surfaces so as to present generally streamlined or airfoil cross sections for minimum resistance to air flow.

The fuel for combustion is supplied principally immediately ahead of the flameholders 31 and 32. Preferably the fuel is sprayed into the combustion gases in both upstream and downstream directions for most effective vaporization before the fuel and gas mixture reaches the combustion zone back of the flameholder.

A feature of the invention is a fuel spray manifold which is particularly adapted to withstand the unfavorable environment with its problems of high temperature, rapid temperature changes, and heavy vibrations, and which is nevertheless extremely simple. The fuel manifold 53, as best shown in Figures 2 and 3, comprises a single continuous non-branching tube 53 which extends from a fitting or coupling 54 at the wall of the duct radially inward, continues into a circular portion 56 immediately forward of the outer flameholder 31, then continues through a generally radial recurved portion 57 to a second circular portion 58 immediately forward of the inner flameholder 32, and finally terminates in a portion 59 extending into the tube 48. The fitting indicated generally at 54 may be of any conventional type, as illustrated in Figure 3, by which the fuel is conducted through the wall of the duct and may be threaded as indicated at 61 for connection to a fuel source (not illustrated). The manifold 53 is coupled to the fitting 54 by a convention union 62.

The continuous pipe or tube 53 is held in place by clips or supports 63 best shown in Figures 2, 3, and 6, which may be formed of heavy wire or light rod. These clips loop around the tube and the extending ends are welded to the inner and outer rings of the flameholders. This arrangement for mounting the manifold is sufficiently flexible to accommodate a certain amount of distortion without undue strains and yet locates the manifold with sufficient accuracy relative to the flameholders. It also permits relative circumferential expansion of the flameholder and manifold, which is important because the manifold is cooled by the fuel and is thus much cooler in operation than the flameholder. The number of clips 63 may be varied to suit the installation.

The portions 56 and 58 of the manifold are drilled to provide a plurality of fuel outlets 66 and 67 in both the upstream and downstream faces, some of which are indicated in Figures 4 and 6, through which fuel is sprayed due to the relatively high pressure in the manifold. It will be understood that a more elaborate arrangement of fuel nozzles may be mounted on the manifold portions 56 and 58, if desired, but the drilled openings have been found to be adequate. The fuel manifold is slightly spaced from the flameholders as illustrated and the forward wall of the flameholder is cut away to the rear of the fuel spray openings 67, as indicated at 68 in Figures 2, 4, and 6 so that part of the fuel-laden gas is admitted to the flameholder channels through the forward faces thereof. The remainder of the fuel-laden gas flows around the flameholders, and combustion is principally maintained in a zone of controlled turbulence downstream from the flameholders.

The end portion 59 of the manifold 53 is closed by a plug 71 and is provided with one or more perforations 72 through which fuel is sprayed into the interior of the tube 48 for pilot ignition by electric arc fuel ignition means. A baffle plate 73 is mounted transversely of the tube 48 downstream from the fuel inlet 59. This baffle plate, which is approximately circular, has three tabs 74 which are extended into arms 76 disposed between the strut portions 51 of the sections of the tube 48 so as to hold the baffle plate in position.

Preferably, two fuel igniters are provided. As illustrated in Figures 2, 3, and 5, each igniter comprises a connector fitting 77 extending through the duct wall 21 and provided with a threaded coupling 78 for connection of a high tension lead from a suitable ignition generator. A bus bar 79 extends from each of the connectors 77 into the tube 48 where it terminates adjacent the baffle plate 73 so that a spark gap is provided between the bus 79 and the plate. Each bus 79 is supported and insulated at the tube 48 by an insulator 81 through which it is passed, the insulator being formed with a flange which fits against a flat surface of the tube 48. The insulator is held in position by a wire 82 passed through holes in the walls of the tube. The busses 79 are also supported in insulators 83 mounted in brackets 84 welded to the outer flameholder ring 31 and secured by a loop of wire 86 passing through the flanges of the bracket 84. As will be seen, the igniter may be instered into position by threading it through the insulators, after which the fitting 77 is secured to the duct wall in any suitable manner.

The operation of the afterburner is as follows: With the gas turbine engine in operation and the exhaust gases flowing through the afterburner, and with the nozzle 27 in its small area position, fuel under pressure is introduced to the manifold 53 and the ignition generator is energized to set up a discharge between the bus 79 and the plate 73. Fuel sprayed from the outlets 72 within the cone 48 is ignited by the discharge, the baffle plate 73 aiding in creating turbulence to hold the pilot flame which burns rearwardly from the cone 48. This pilot flame ignites the fuel sprayed from the portions 56 and 58 of the fuel manifold, thus initiating complete combustion of the fuel supplied. Immediately upon initiation of the afterburner combustion, the nozzle flaps 27 are opened to their full area position. The added energy imparted by the combustion in the exhaust pipe 24 increases the thrust of the jet propulsion engine. When combustion is established, the ignition is turned off. To terminate afterburning, the fuel supply is shut off and the nozzle flaps are returned to their minimum area position.

Any suitable manual or automatic control means for the fuel supply, ignition, and variable area nozzle may be employed. My invention is not concerned with such controls.

While the invention has been specifically described as an afterburner for a turbojet engine, it will be apparent that the principles, and, to a large extent, the structure illustrated, may be applied to other combustion apparatus. Fields for which the invention seems particularly suited include combustion apparatus for industrial gas turbines employing combustion chambers of large diameter, and ramjet aircraft engines.

It will be apparent that the invention and particularly the preferred embodiment described above is particularly well suited to withstand the environment of gas turbine engines and the like and to provide efficient combustion with a minimum of interference to gas flow.

Many modifications of the exemplary structure disclosed may be devised by skill in the art within the principles of the invention. The invention is not to be regarded as limited by the detailed description of the preferred embodiment.

I claim:

1. A combustion apparatus for a jet propulsion engine comprising, in combination, a generally annular duct adapted for flow of combustion-supporting gas, a flameholder mounted therein comprising two coaxial generally annular rings of channel section with the closed side of the channel upstream, a generally conical pilot flame tube diverging downstream and open at both ends located axially of the duct, a continuous fuel manifold extending around the upstream faces of the flameholder rings and supported thereon and terminating within the flame tube, means defining fuel spray orifices in the fuel manifold adjacent the flameholder rings and at least one fuel spray orifice in the fuel manifold within the flame tube, and at least one igniter extending into the flame tube.

2. A combustion apparatus for a jet propulsion engine comprising, in combination, a generally annular duct adapted for flow of combustion-supporting gas, a flameholder mounted therein comprising two coaxial generally annular rings of channel section with the closed side of the channel upstream, a continuous fuel manifold extending around the upstream faces of the flameholder rings in opposite directions, means defining fuel spray orifices in the fuel manifold adjacent the flameholder rings, and means supporting the manifold on the flameholder rings with freedom for relative circumferential movement.

3. A combustion apparatus for a jet propulsion engine comprising, in combination, a generally annular duct adapted for flow of combustion-supporting gas, a flameholder mounted therein comprising two coaxial generally annular rings of channel section with the closed side of the channel upstream, a continuous fuel manifold extending around the upstream faces of the flameholder rings in opposite directions, means defining fuel spray orifices in the fuel manifold adjacent the flameholder rings, and means supporting the manifold on the flameholder rings with freedom for relative expansion comprising clips encircling the manifold and fixed to the flameholder rings.

4. A combustion apparatus for a jet propulsion engine comprising in combination, a generally annular duct adapted for flow of combustion-supporting gas, a flameholder mounted therein comprising two coaxial generally annular rings of channel section with the closed side of the channel upstream, a continuous fuel manifold extending around the upstream faces of the flameholder rings in opposite directions, means defining fuel spray orifices on the upstream and downstream faces of the fuel manifold adjacent the flameholder rings, means defining apertures in the flameholder rings aligned with the downstream fuel spray orifices, and means supporting the manifold on the flameholder rings with freedom for relative circumferential expansion.

5. A combustion apparatus for a jet propulsion engine comprising, in combination, a generally annular duct adapted for flow of combustion-supporting gas, a flameholder mounted therein of channel section with the closed side of the channel upstream, a pilot flame tube open at both ends located axially of the duct upstream of the flameholder, a fuel manifold adjacent the upstream face of the flameholder and extending into the flame tube, means defining fuel spray orifices in the fuel manifold adjacent the flameholder and at least one fuel spray orifice within the flame tube, and at least one igniter comprising a bus bar extending from the duct wall into the flame tube and supported in insulators mounted on the flameholder and flame tube.

6. A combustion apparatus for a jet propulsion engine comprising, in combination, a generally annular duct adapted for flow of combustion-supporting gas, a flameholder mounted therein comprising two coaxial generally annular rings of channel section with the closed side of the channel upstream, a pilot flame tube open at both ends located axially of the duct upstream of the flameholder, a continuous fuel manifold extending around the upstream faces of the flameholder rings in opposite directions and terminating within the flame tube, means defining fuel spray orifices in the fuel manifold adjacent the flameholder rings and at least one fuel spray orifice within the flame tube, means supporting the manifold on the flameholder rings with freedom for relative circumferential movement, and at least one igniter comprising a bus bar extending from the duct wall into the flame tube and supported in insulators mounted on the flameholder and flame tube.

7. A combustion apparatus for a jet propulsion engine comprising, in combination, a generally annular duct adapted for flow of combustion-supporting gas, a flameholder mounted therein of channel section with the closed side of the channel upstream, the flameholder being formed by two flanged rings with the flanges thereof overlapping, a pilot flame tube diverging downstream and open at both ends located axially of the duct upstream of the flameholder, the pilot flame tube comprising a plurality of circumferential sections terminating in radial portions forming struts fixed to the flameholder, and a fuel manifold extending around the upstream faces of the flameholder and terminating within the flame tube with means defining fuel spray orifices in the fuel manifold adjacent the flameholder and at least one fuel spray orifice within the flame tube, apertures being formed in the flameholder aligned with fuel spray orifices in the manifold.

8. A combustion apparatus for a jet propulsion engine comprising, in combination, a generally annular duct adapted for flow of combustion-supporting gas, a flameholder mounted therein comprising two coaxial generally annular rings of channel section with the closed side of the channel upstream, means providing for radial expansion for supporting the flameholder from the wall of the duct, a generally conical pilot flame tube diverging downstream and open at both ends located axially of the duct upstream of the flameholder, a continuous fuel manifold extending around the upstream faces of the flameholder rings and terminating within the flame tube, means defining fuel spray orifices on the upstream and downstream faces of the fuel manifold adjacent the flameholder rings and at least one fuel spray orifice within the flame tube, means defining apertures in the flameholder rings aligned with the downstream fuel spray orifices, means supporting the manifold on the flameholder rings with freedom for relative circumferential movement, and at least one igniter comprising a bus bar extending from the duct wall into the flame tube and supported in insulators mounted on the flameholder and flame tube.

9. A combustion apparatus for a jet propulsion engine comprising, in combination, a generally annular duct adapted for flow of combustion-supporting gas, a flameholder mounted therein comprising two coaxial generally annular rings of channel section with the closed side of the channel upstream, means for supporting the flameholder from the wall of the duct, a generally conical pilot flame tube diverging downstream and open at both ends located axially of the duct upstream of the flameholder, a continuous fuel manifold extending around the upstream faces of the flameholder rings and terminating within the flame tube, means defining fuel spray orifices on the upstream and downstream faces of the fuel manifold adjacent the flameholder rings and at least one fuel spray orifice within the flame tube means defining downstream apertures in the flameholder rings aligned with the downstream fuel spray orifices, and means supporting the manifold on the flameholder rings with freedom for relative circumferential movement.

10. A combustion apparatus for a jet propulsion engine comprising, in combination, a generally annular duct adapted for flow of combustion-supporting gas, a flameholder mounted therein comprising two coaxial generally annular rings of channel section with the closed side of the channel upstream, a pilot flame tube open at both ends located axially of the duct upstream of the flameholder, a continuous fuel manifold extending around the upstream faces of the flameholder rings in opposite directions and terminating within the flame tube, means defining fuel spray orifices in the fuel manifold adjacent the flameholder rings and at least one fuel spray orifice within the flame tube, and means supporting the manifold on the flameholder rings with freedom for relative circumferential movement.

11. A combustion apparatus for a jet propulsion engine comprising, in combination, a generally annular duct adapted for flow of combustion-supporting gas, a generally annular flameholder ring mounted in the duct, a fuel manifold extending around the upstream face of the flameholder ring, means defining fuel spray orifices in the fuel manifold adjacent the flameholder ring, and means supporting the manifold on the flameholder ring with freedom for relative circumferential movement.

12. A combustion apparatus for a jet propulsion engine comprising, in combination, a generally annular duct adapted for flow of combustion-supporting gas, a generally annular flameholder ring mounted in the duct, a fuel manifold extending around the upstream face of the flameholder ring, means defining fuel spray orifices in the fuel manifold adjacent the flameholder ring, and means supporting the manifold on the flameholder ring with freedom for relative circumferential movement, the fuel manifold having a gap therein providing for relative circumferential expansion of the fuel manifold and flameholder ring.

13. A combustion apparatus for a jet propulsion engine comprising, in combination, a generally annular duct adapted for flow of combustion-supporting gas, a flameholder mounted therein comprising two coaxial generally annular rings, a continuous fuel manifold extending around the upstream faces of the flameholder rings, the manifold extending from a fuel inlet thereto around one flameholder ring in one circumferential direction, continuing to the other flameholder ring, and extending around the other flameholder ring in the other circumferential direction, means defining fuel spray orifices in the fuel manifold adjacent the flameholder rings, and means supporting the manifold on the flameholder rings with freedom for relative circumferential movement.

References Cited in the file of this patent
UNITED STATES PATENTS

| | | |
|---|---|---|
| 2,385,833 | Nahigyan | Oct. 2, 1945 |
| 2,420,135 | Hennig | May 6, 1947 |
| 2,443,054 | Putz et al. | June 8, 1948 |
| 2,482,505 | Pierce | Sept. 20, 1949 |
| 2,508,420 | Redding | May 23, 1950 |
| 2,540,594 | Price | Feb. 16, 1951 |
| 2,701,444 | Day | Feb. 8, 1955 |
| 2,720,078 | Day et al. | Oct. 11, 1955 |